3,497,409
METHOD OF FORMING A MOISTURE IMPERVIOUS PANEL
Arthur G. Clem, Des Plaines, Ill., assignor to American Colloid Company, Skokie, Ill., a corporation of Delaware
Filed Feb. 1, 1966, Ser. No. 524,252
Int. Cl. B32b 13/08, 31/06
U.S. Cl. 156—213                                           1 Claim

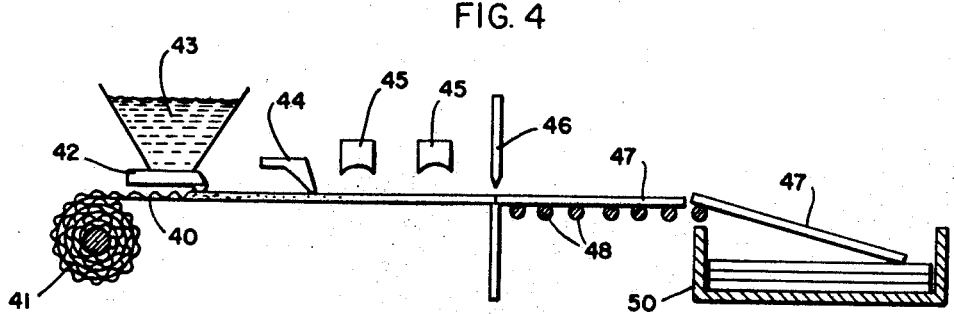
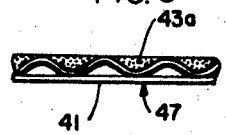
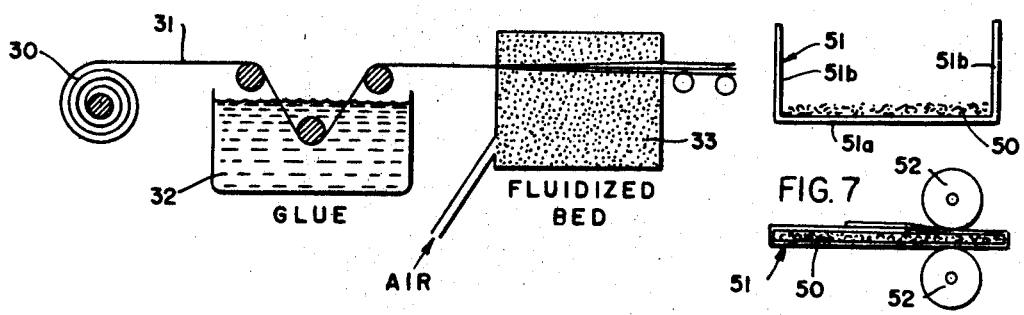
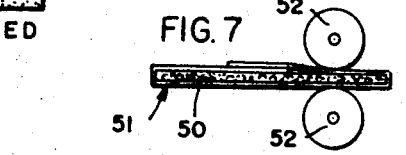
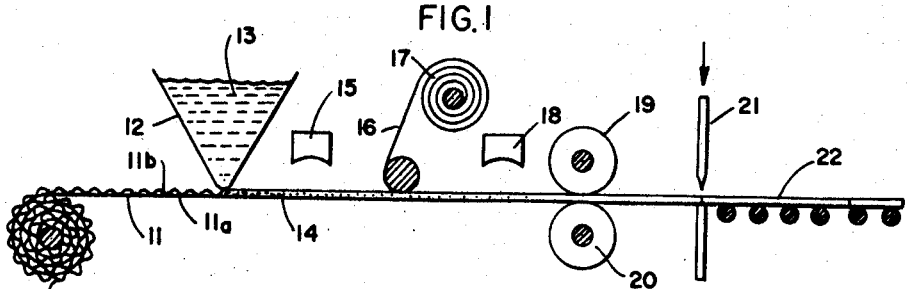
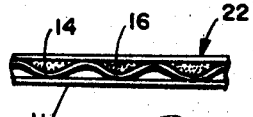
INVENTOR:
ARTHUR G. CLEM United States Patent Office 3,497,409
Patented Feb. 24, 1970

ABSTRACT OF THE DISCLOSURE

There is provided a method of forming a moisture impervious panel of the type providing a layer of water swellable bentonite clay on a backing board. There is first formed a mixture of granular bentonite clay with a suitable fluid material; a layer of the mixture is then applied to one or more surfaces of the supporting sheet; and the layer of bentonite clay on the sheet is then cured to provide the barrier board. The mixture may include the bentonite with a suitable thermoplastic organic binder, a fluidized bed, or other suitable fluid carrier.

---

This invention relates to an improved method of forming a moisture impervious panel, and, more particularly, to an improved method of forming a rigid moisture impervious panel of the type employing a water-swellable bentonite clay as a water barrier.

It is already known to provide seepage resistant structures by utilizing a bulk fill of swellable bentonite across the path of possible seepage or flow and confining the mass to the area of possible seepage. One such method and means for impeding the seepage or flow of water is disclosed in United States Patent No. 2,277,286 granted Mar. 24, 1942 to Paul Bechtner, and assigned to the same assignee as the present invention. As therein more fully described, commercial bentonite was used to block leakage or flow of water seepage and structures of various types were safeguarded against leakage by blocking the path of flow of the water with highly colloidal clay which possesses the capacity to swell and gelatinize upon contact with water. One of the clays found best suited for this purpose was the true bentonite obtained in regions of Wyoming and South Dakota, although other highly colloidal, or bentonitic clays which possess the property of swelling and gelatinizing in water to a substantial degree are also useful. The degree of their effectiveness, of course, depends upon the closeness with which this swelling properly corresponds to that of true bentonite. The technique of using the bulk fill method is recommended and is used on essentially horizontal surfaces.

For application to vertical surfaces, forms or bulkheads were initially used and the space defined by the bulkhead was filled with granular bentonite clay.

One improvement over the bulk filling method of bentonite is disclosed in my earlier Patent No. 3,186,896 granted June 1, 1965 and assigned to the same assignee as the present invention. As therein disclosed, granular bentonite fills the voids in double-faced corrugated paper board to provide a panel which may be readily transported and cut into shape at the site of usage. Although the bentonite panel performs satisfactorily in its intended applications, difficulty has been experienced with the manufacture of the bentonite panel in that it is difficult commercially to fill the voids of preformed corrugated paper board.

Accordingly it is an object of the present invention to provide an improved method of forming a moisture impervious panel.

A further object of the present invention is to provide an improved method of forming a moisture impervious panel of the type including a corrugated paper board supporting sheet.

Yet a further object of the present invention is to provide an improved method of forming a rigid bentonite panel.

Further objects and advantages of the present invention will become apparent as the following description proceeds and the features of novelty which characterize the invention will be pointed out with particularity in the claim annexed to and forming a part of this specification.

In accordance with the present invention, the improved method of forming a bentonite barrier board of the type including a layer or coating of unswollen swellable bentonite clay formed on a surface of a supporting sheet, and including the steps of forming a mixture of granular bentonite clay with a suitable fluid material, applying the mixture of bentonite clay to at least one surface of a supporting sheet, and curing the mixture on the sheet to provide a bentonite barrier board.

In accordance with a further embodiment of the invention, the improved method includes forming a mixture of bentonite and thermoplastic organic binder, and applying the mixture to the corrugated side of a single-faced corrugated paper. The mixture is thereafter heated to bond the bentonite granules to the corrugated paper. If desired a second layer of facing paper may be applied to the corrugated board to provide a double-faced corrugated panel.

For a better understanding of the present invention, reference may be had to the accompanying drawings wherein:

FIG. 1 is a schematic representation of a preferred method of forming a bentonite barrier board according to the present invention;

FIG. 2 is a fragmentary end view of a bentonite board made in accordance with the method of FIG. 1, and drawn to a larger scale;

FIG. 3 is another emodiment of a method for forming a barrier board according to the present invention;

FIG. 4 is yet another embodiment of a method for forming a bentonite barrier board according to the present invention;

FIG. 5 is a fragmentary end view of a bentonite board made in accordance with the method of FIG. 4, and drawn to a larger scale; and FIGS. 6 and 7 are schematic illustrations showing yet another embodiment of a method of forming a bentonite panel according to the present invention.

Referring now to the drawings, and particularly to the embodiment of FIG. 1, there is illustrated a method of forming a barrier board according to the present invention. As schematically illustrated, there is provided a roll 10 of single-faced corrugated paper from which a single-faced corrugated or paper board 11 passes under a hopper 12 of a mixture of bentonite and a suitable fluid material such as a thermoplastic organic binder, the mixture being generally represented as 13. The paper board 11 includes a face sheet 11a carrying fluted or corrugated sheet 11b. The mixture is applied to the corrugated side of the paper board 11 to provide a layer 14 of bentonite mixture on the corrugated board, as best illustrated in FIG. 2. A radiant heater 15 bonds the bentonite granules to the corrugated board.

If desired a second facing sheet 16, taken from a roll 17 may be passed over the open face surface of the corrugated paper 11 to provide a double-faced corrugated sheet. A second radiant heater 18, if desired, may also be used to complete curing of the bentonitic mixture. The double-faced corrugated board containing the bentonite material is passed between a pair of pressure rollers 19, 20 and thereafter through a suitable shear or cutting device 21 to provide suitable bentonite panels 22 which take on substantially the character of the panels described in my earlier mentioned patent.

It will be understood that in accordance with the present invention the improved method of forming the bentonite barrier board 22 includes the steps of forming a mixture of granular bentonite clay with a suitable fluid material, here shown as a thermoplastic organic binder, thereafter applying a layer or coating the mixture to at least one surface of the supporting sheet 11, and thereafter curing the mixture on the sheet to provide the bentonite barrier board 22.

In accordance with another embodiment of the present invention all illustrated in FIG. 3, there is provided a roll 30 of kraft paper or other suitable supporting sheet from which is unrolled a continuous strip 31 of supporting paper. The supporting paper 31 passes through a container of glue 32, coating both sides of the paper 31. Thereafter the supporting paper 31 containing the glue passes through a fluidized bed 33 of bentonite and the bentonite adheres to each side of the glued paper. It will be understood that the fluidized bed 33 includes a mixture of granular bentonite clay with a gaseous fluid material to provide an air suspension of granular bentonite. Moreover the coated board may subsequently be passed through additional passes of glue and bentonite clay until the desired thickness of bentonite is built up onto the supporting board. The glue may thereafter be cured in the proper manner to provide the bentonite panel.

FIG. 4 illustrates an embodiment of the persent invention wherein suitable single-faced corrugated paper board 40 is removed from a roll 41 and passes below a pump feeder 42 effective to eject a mixture 43 of granular bentonite and organic binder in suitable solvent such as alcohol onto the corrugated side of the paper board 40 to form a layer 43a, as illustrated in FIG. 5. If desired a scraper blade 44 may be provided for accurately controlling the thickness of the bentonite on the paper board 40. Suitable radiant heating lamps or solvent evaporators 45 cure the mixture by driving off the solvent. Thereafter the single-faced corrugated board containing the layer of bentonite may be sheared to the desired length, as illustrated at 46, and the panels 47 of bentonite board formed thereby may pass on suitable rollers 48 into a hopper 50.

In accordance with the embodiment of FIGS. 6 and 7, coarsely crushed or chopped granular bentonite 50 in suitable organic binder is spread over the bottom surface of a paper container 51 including a bottom surface 51a and two comparatively long side flaps 51b. The side flaps 51b are then folded inwardly, as illustrated in FIG. 5, and the assembly then passed between a pair of pressure rollers 52. It will be seen that the side flaps 51b are long enough to overlap when folded. The completed panel may thereafter be cut to small length if desired to provide the completed bentonite barrier boards.

What is claimed as new and desired to be secured by Letters Patent of the United States is:

1. A method of forming a rigid moisture impervious barrier board including a layer of unswollen swellable bentonite clay formed on a surface of a supporting sheet, the method including the steps of:

distributing a layer of coarse crushed bentonite with suitable solvent soluble organic binders on a paper container of the type having a bottom and comparatively long erect side flaps;

folding the side flaps inwardly so that the edges thereof overlap each other;

passing the folded container between suitable pressure means; and thereafter curing the organic binder to provide a rigid bentonite core barrier board.

References Cited

UNITED STATES PATENTS

| 1,158,667 | 11/1915 | Fairchild | 161—125 |
| 2,245,666 | 6/1941 | Hardesty | 156—40 |
| 2,395,157 | 2/1946 | Work et al. | 117—33 |
| 2,983,636 | 5/1961 | Runton | 156—210 |
| 3,150,034 | 9/1964 | Vukasovich et al. | 162—159 X |
| 3,186,896 | 6/1965 | Clem | 161—133 |

FOREIGN PATENTS 114,053    10/1941    Australia.

HAROLD ANSHER, Primary Examiner

R. A. KILLWORTH, Assistant Examiner

U.S. Cl. X.R.

161—43, 209, 410